(12) United States Patent
Lee et al.

(10) Patent No.: US 10,663,642 B2
(45) Date of Patent: May 26, 2020

(54) BACKLIGHT UNIT, DISPLAY APPARATUS INCLUDING THE SAME AND METHOD OF MANUFACTURING THE SAME

(71) Applicant: Samsung Display Co., Ltd., Yongin-si, Gyeonggi-do (KR)

(72) Inventors: Hongbeom Lee, Hwaseong-si (KR); Dongwoo Kim, Seoul (KR); Minsu Kim, Hwaseong-si (KR); Keunwoo Park, Incheon (KR); Seongyeon Lee, Asan-si (KR); Taewoo Lim, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/364,644

(22) Filed: Mar. 26, 2019

(65) Prior Publication Data

US 2019/0310409 A1    Oct. 10, 2019

(30) Foreign Application Priority Data

Apr. 9, 2018 (KR) ........................ 10-2018-0041022

(51) Int. Cl.
*F21V 8/00* (2006.01)
*G02F 1/1335* (2006.01)

(52) U.S. Cl.
CPC ........... *G02B 6/005* (2013.01); *G02B 6/0055* (2013.01); *G02B 6/0065* (2013.01); *G02F 1/133528* (2013.01)

(58) Field of Classification Search
CPC .... G02B 6/0035; G02B 6/005; G02B 6/0093; G02B 6/0055; G02B 6/0058; G02B 6/0061; G02B 6/0065
See application file for complete search history.

(56) References Cited

U.S. PATENT DOCUMENTS

| | | | |
|---|---|---|---|
| 9,505,028 B2 * | 11/2016 | Steiner | .................... B05D 5/06 |
| 9,831,138 B2 | 11/2017 | Lee et al. | |
| 10,444,423 B2 * | 10/2019 | Dubrow | ............... G02B 6/0073 |

(Continued)

FOREIGN PATENT DOCUMENTS

| | | |
|---|---|---|
| JP | 2016-181474 A | 10/2016 |
| JP | 2017-68250 A | 4/2017 |

(Continued)

*Primary Examiner* — Anh T Mai
*Assistant Examiner* — Michael Chiang
(74) *Attorney, Agent, or Firm* — Lewis Roca Rothgerber Christie LLP

(57) ABSTRACT

A display apparatus includes a display panel configured to display an image, a light guide member below the display panel, a light source adjacent to at least one surface of the light guide member, and an optical member between the light guide member and the display panel. The optical member includes a wavelength conversion layer configured to convert a wavelength band of incident light. A low refractive index layer between the wavelength conversion layer and the light guide member and including a plurality of pores, and an inorganic layer between the low refractive index layer and the wavelength conversion layer. A volume ratio occupied by the pores within the low refractive index layer increases as being closer to the light guide member.

20 Claims, 14 Drawing Sheets

(56) References Cited

U.S. PATENT DOCUMENTS

| | | | |
|---|---|---|---|
| 2010/0040806 A1* | 2/2010 | Suzuki | B29C 55/12 |
| | | | 428/1.31 |
| 2015/0003040 A1* | 1/2015 | Bessho | F21V 9/40 |
| | | | 362/84 |
| 2016/0161657 A1* | 6/2016 | Yamada | G02F 1/1336 |
| | | | 349/62 |
| 2018/0252968 A1* | 9/2018 | Nakamura | G02F 1/133606 |
| 2018/0309073 A1* | 10/2018 | Nakamura | G02B 27/095 |

FOREIGN PATENT DOCUMENTS

| | | |
|---|---|---|
| JP | 2017-138558 A | 8/2017 |
| JP | 2017-161938 A | 9/2017 |

* cited by examiner

BACKLIGHT UNIT, DISPLAY APPARATUS INCLUDING THE SAME AND METHOD OF MANUFACTURING THE SAME

CROSS-REFERENCE TO RELATED APPLICATIONS

This application claims priority to and the benefit of Korean Patent Application No. 10-2018-0041022, filed on Apr. 9, 2018, the entire content of which is hereby incorporated by reference.

BACKGROUND

The present disclosure herein relates to a display apparatus, and more particularly, to a display apparatus with improved display quality and increased durability.

Display apparatuses have been in the spotlight as next-generation high-tech display devices because of low power consumption, good portability, and high added value. A display apparatus may include a thin film transistor for each pixel to adjust (e.g., on/off) a voltage for each pixel.

The display apparatus may include a display panel and a backlight unit providing light to the display panel. The backlight unit may include a light source and a light guide plate. Light generated from the light source is guided to the inside of the light guide plate and then provided to the display panel.

The above information disclosed in this Background section is only for enhancement of understanding of the background of the invention and therefore it may contain information that does not constitute prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

The present disclosure provides a display apparatus with improved display quality and increased durability.

An embodiment of the inventive concept provides a display apparatus that includes a display panel configured to display an image; a light guide member below the display panel; a light source adjacent to at least one surface of the light guide member; and an optical member between the light guide member and the display panel, wherein the optical member includes a wavelength conversion layer configured to convert a wavelength band of incident light; a low refractive index layer between the wavelength conversion layer and the light guide member and including a plurality of pores; and an inorganic layer between the low refractive index layer and the wavelength conversion layer, wherein a volume ratio occupied by the pores within the low refractive index layer increases as being closer to the light guide member.

In an embodiment, the low refractive index layer may include a first portion having a first refractive index and including the pores; and a second portion on the first portion and having a second refractive index, wherein the second refractive index is greater than the first refractive index and less than that of the wavelength conversion layer.

In an embodiment, a ratio of a thickness of the second portion to the total thickness of the low refractive index layer may be about 0.3 to about 0.5.

In an embodiment, the inorganic layer may include a plurality of crystal particles.

In an embodiment, the inorganic layer may have a thickness of about 700 Å to about 1,500 Å.

In an embodiment, the inorganic layer may include silicon nitride ($SiN_x$).

In an embodiment, the inorganic layer may include silicon oxide ($SiO_x$).

In an embodiment, the inorganic layer may be provided in plurality, and the plurality of inorganic layers may include a first inorganic layer; and a second inorganic layer between the first inorganic layer and the wavelength conversion layer.

In an embodiment, the first inorganic layer may include a material different from that of the second inorganic layer.

In an embodiment, each of the first inorganic layer and the second inorganic layer may have a thickness of about 200 Å to about 600 Å.

In an embodiment, the optical member may further include a sub low refractive index layer between the first inorganic layer and the second inorganic layer.

In an embodiment, the optical member may further include an organic layer between the first inorganic layer and the second inorganic layer.

In an embodiment, the optical member may further include an organic layer between the inorganic layer and the wavelength conversion layer.

In an embodiment, the optical member may further include an organic layer between the inorganic layer and the low refractive index layer.

In an embodiment, the optical member may further include a barrier layer on the wavelength conversion layer and including an inorganic material.

In an embodiment, the light source may generate blue light or near-ultraviolet light, and the wavelength conversion layer may include a plurality of wavelength conversion particles.

In an embodiment of the inventive concept, a method of manufacturing a display apparatus includes preparing a display panel; and forming an optical member on a light guide member, wherein the forming of the optical member includes forming a low refractive index layer on the light guide member; depositing an inorganic material on the low refractive index layer to form an inorganic layer; and applying a wavelength conversion solution to the inorganic layer to form a wavelength conversion layer, wherein the forming of the low refractive index layer includes applying a preliminary solution to the light guide member; and drying the preliminary solution to form a plurality of pores, wherein, in the forming of the wavelength conversion layer, a portion of the wavelength conversion solution is permeated into at least a portion of the pores formed in the low refractive index layer.

In an embodiment, the formation of the inorganic layer may include depositing inorganic crystal particles on the low refractive index layer; and adjusting a deposition time of the inorganic crystal particles to adjust a thickness of the inorganic layer, wherein, in the adjusting of the thickness of the crystal particles, an amount of wavelength conversion solution permeated into the pores of the low refractive index layer may be adjusted according to a size of each of pin holes or the number of pin holes, each of the pin holes being defined as a space between the inorganic crystal particles.

In an embodiment, the forming of the inorganic layer may include depositing a first inorganic layer on the low refractive index layer; and depositing a second inorganic layer on the first inorganic layer after depositing the first inorganic layer.

In an embodiment of the inventive concept, a backlight unit includes a light source configured to generate blue light or near-ultraviolet light; a light guide member having at least one surface adjacent to the light source; and an optical member on the light guide member, wherein the optical member includes a wavelength conversion layer configured to convert a wavelength band of incident light; a low refractive index layer between the wavelength conversion layer and the light guide member and including a plurality of pores; and an inorganic layer between the low refractive index layer and the wavelength conversion layer, wherein a volume ratio occupied by the pores within the low refractive index layer increases as being closer to the light guide member.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
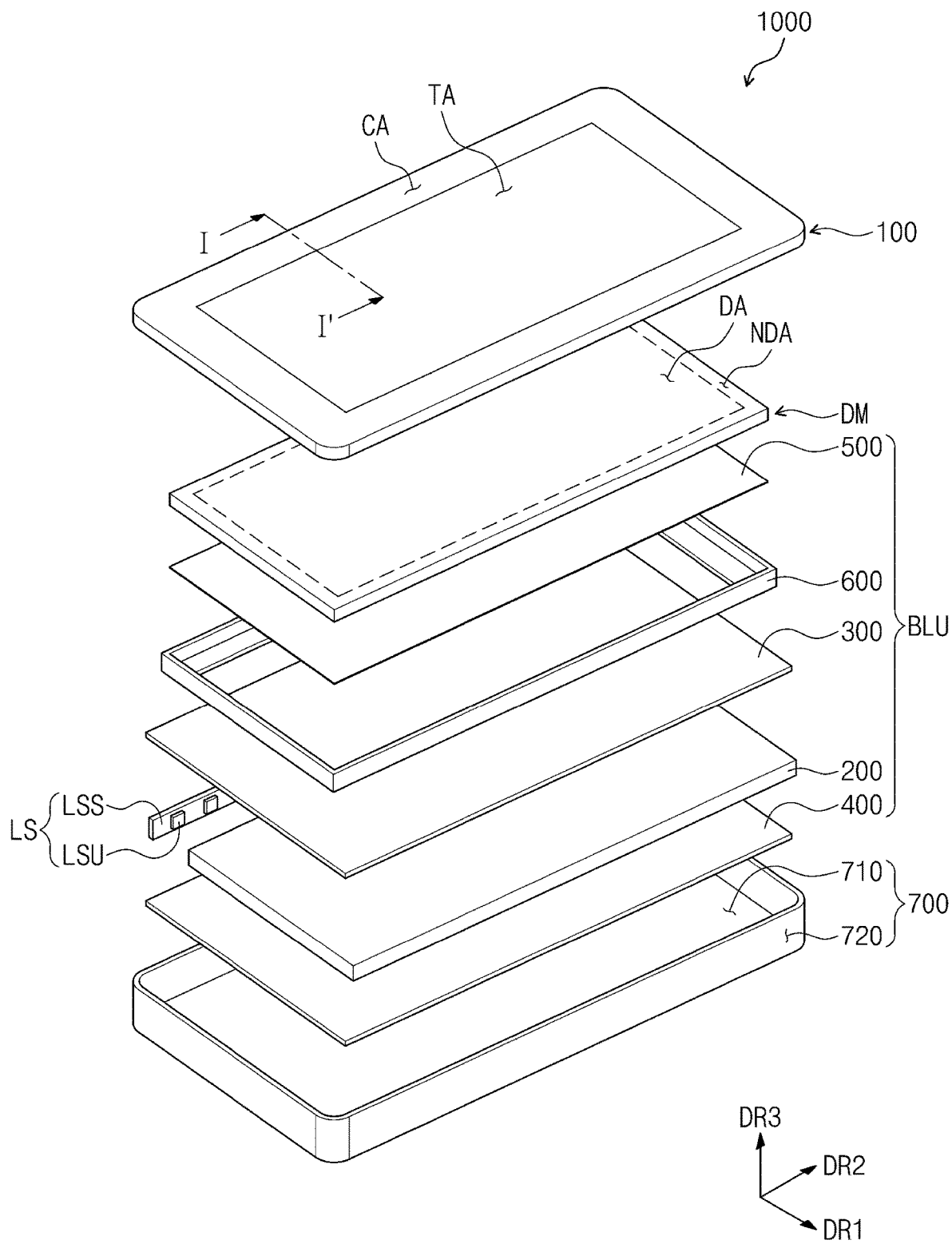
FIG. 1 is an exploded perspective view of a display apparatus according to an embodiment of the inventive concept.

Advantages and features of the present invention, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the present disclosure is only defined by scopes of claims. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the inventive concept. Like reference numerals refer to like elements throughout.

It will be understood that although the terms of first and second are used herein to describe various elements and/or sections, these elements and/or sections should not be limited by these terms. These terms are only used to distinguish one element, component, or section from another element, component, or section. Accordingly, a first element, a first component, or a first section that will be described below may be a second element, a second component, or a second section within the technical idea of the present disclosure.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The embodiment in the detailed description will be described with schematic cross-sectional views and/or plan views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the inventive concept.

Hereinafter, exemplary embodiments of the inventive concept will be described below in more detail with reference to the accompanying drawings.

Figure 2:
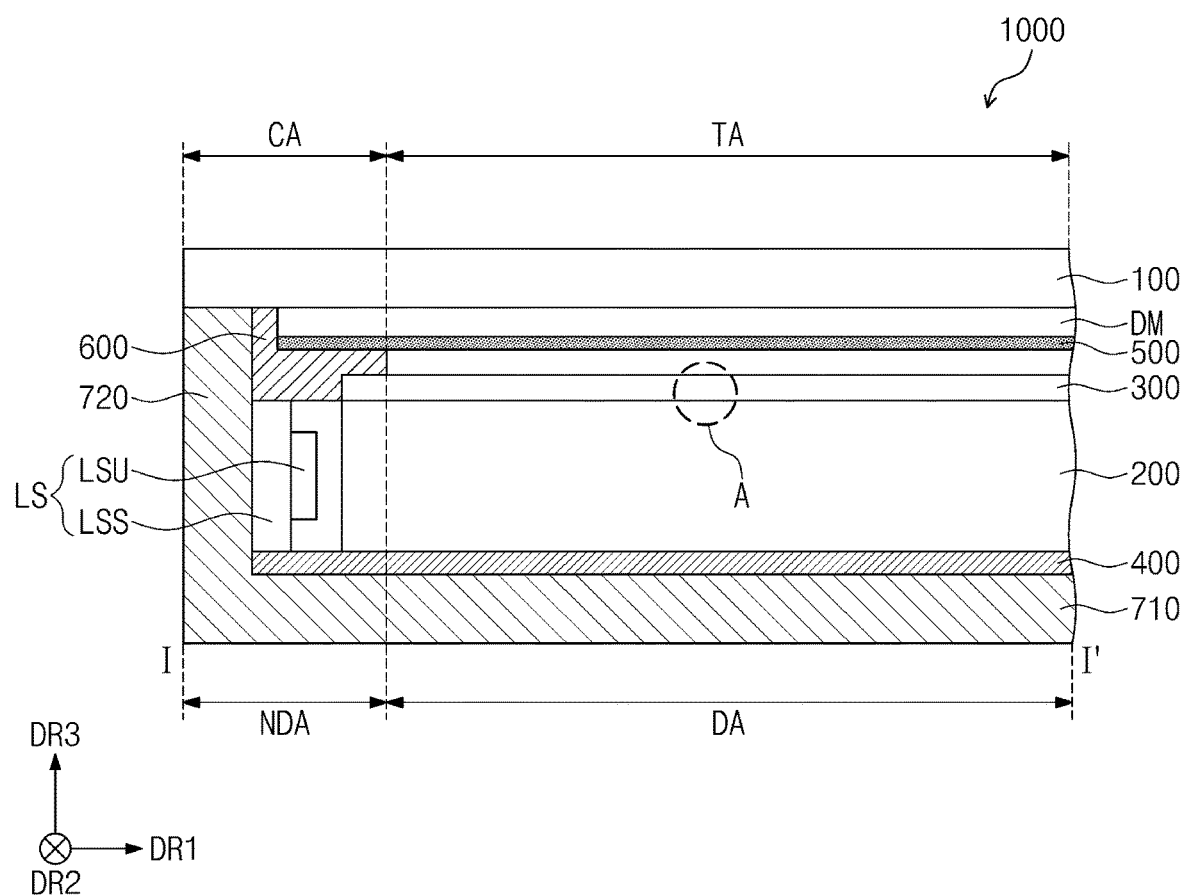
FIG. 2 is a cross-sectional view taken along line I-I' of FIG. 1.

FIG. 1 is an exploded perspective view of a display apparatus according to an embodiment of the inventive concept, and FIG. 2 is a cross-sectional view taken along line I-I' of FIG. 1.

Referring to FIGS. 1 and 2, a display apparatus 1000 according to an embodiment of the inventive concept has a rectangular shape with a short side in a first direction DR1 and a long side in a second direction DR2. However, a display apparatus 1000 according to another embodiment of the inventive concept is not limited to the above-described shape and thus may have various shapes.

The display apparatus 1000 includes a window member 100, a display member DM, a backlight unit BLU, and an accommodation member 700.

For convenience of description, a direction in which an image is displayed from the display apparatus 1000 may be defined as an upward direction, and a direction opposite to the upward direction may be defined as a downward direction. In this embodiment, the upward and downward directions are parallel to a third direction DR3 that is defined in a normal direction of a plane defined by the first and second directions DR1 and DR2. The third direction DR3 may be a reference direction for dividing front and rear surfaces of components that will be described below. However, the upward direction and the downward direction may be a relative concept, and thus may be changed in different directions.

The window member 100 may include a light transmitting part TA that transmits an image provided from the display member DM and a light blocking part CA through which the image is not transmitted. The light transmitting part TA is on a central portion of the display apparatus 1000 on a plane defined in the first and second directions DR1 and DR2. The light blocking part CA is around the light transmitting part TA and has a frame shape surrounding the light transmitting part TA. However, the embodiments of the inventive concept are not limited to the shapes of the light transmitting part TA and the light blocking part CA of the window member 100. A window member 100 according to another embodiment of the inventive concept may include only the light transmitting part TA. That is, the light blocking part CA may be omitted.

The window member 100 may be made of a material including glass, sapphire, or plastic.

The display member DM is below the window member 100. The display member DM displays an image by using light provided from the backlight unit BLU. That is, the display member DM may be a light-receiving type display panel. For example, according to an embodiment of the inventive concept, the display member DM includes a liquid crystal display panel.

A surface of the display member DM, on which an image is displayed, is defined as a display surface on a plane. The display surface includes a display area DA on which an image is displayed on the display surface and a non-display area NDA on which an image is not displayed. The display area DA may be defined at a center of the display member DM on the plane to overlap the light transmitting part TA of the window member 100.

The backlight unit BLU may be below the display member DM to provide light to the display member DM. According to this embodiment, the backlight unit BLU may be an edge-type backlight unit. However, the embodiments of the inventive concept are not limited thereto. For example, a backlight unit BLU according to another embodiment of the inventive concept may be a direct-type backlight unit.

The backlight unit BLU according to this embodiment includes a light source LS, a light guide member 200, an optical member 300, a reflection member 400, and a mold frame 600.

The light source LS is at one side of the light guide member 200 in the first direction DR1. However, the embodiments of the inventive concept are not limited to the position of the light source LS. For example, the light source LS may be adjacent to at least one side surface of side surfaces of the light guide member 200.

The light source LS includes a plurality of light source units LSU and a light source substrate LSS.

The light source units LSU generate light to be provided to the display member DM to provide the generated light to the light guide member 200.

According to this embodiment, the light source units LSU may generate a first light. The first light may have a first wavelength band. For example, the first wavelength band may range from about 400 nm to about 500 nm. That is, the light source units LSU may substantially generate near-ultraviolet light or blue light.

According to this embodiment, each of the light source units LSU may have a shape in which a light emitting diode (LED) is used as a point light source. However, the embodiments of the inventive concept are not limited to the kind of light source units LSU.

Also, the embodiments of the inventive concept are not limited to the number of light source units LSU. According to another embodiment of the inventive concept, the light source units LSU may not be provided in plurality but may be provided as one point light source using the LED. Alternatively, the light source units LSU may be provided with a plurality of LED groups. Also, according to another embodiment of the inventive concept, the light source units LSU may be a line light source.

The light source units LSU may be mounted on the light source substrate LSS. The light source substrate LSS faces one side of the light guide member 200 in the first direction DR1 and extends in the second direction DR2. The light source substrate LSS may include a light source control unit connected to the light source units LSU. The light source control unit may analyze an image displayed on the display member DM to output a local dimming signal and control luminance of light generated by the light source unit LSU in response to the local dimming signal. According to another embodiment of the inventive concept, the light source control unit may be mounted on a separate circuit board. However, the embodiments of the inventive concept are not limited to the mounted position of the light source control unit.

The light guide member 200 may include a material having high light transmittance in a visible light region. For example, the light guide member 200 may include a glass material. According to another embodiment, the light guide member 200 may be made of a transparent polymer resin such as polymethyl methacrylate (PMMA). In this embodiment, the light guide member may have a refractive index of about 1.4 to about 1.55.

The light guide member 200 may include a plurality of emission patterns PT on a bottom surface of the light guide member 200. The emission patterns PT may refract light incident on the bottom surface of the light guide member 200 to change a reflection angle. The emission patterns PT may have an embossed shape protruding downward from the bottom surface of the light guide member 200. However, the embodiments of the inventive concept are not particularly limited to the shape of each of the emission patterns PT. For example, according to another embodiment of the inventive concept, the emission patterns PT may have an engraved shape and may be recessed upward from the bottom surface of the light guide member 200.

The optical member 300 is on the top surface of the light guide member 200. The optical member 300 may improve light guide performance of the light guide member 200 and may convert a wavelength provided from the light guide member 200. Hereinafter, the light guide member 200 will be described in more detail with reference to FIGS. 4 to 7.

The reflection member 400 may be below the light guide member 200. The reflection member 400 reflects the emitted light to a lower side of the light guide member 200 so that the light is emitted upward. The reflection member 400 includes a light reflecting material. For example, the reflection member 400 may include aluminum or silver.

The display apparatus 1000 according to an embodiment of the inventive concept may further include a light collection or diffusion member 500. The light collection or diffusion member 500 is between the optical member 300 and the display member DM. The light collection or diffusion member 500 collects or diffuses the light received from the optical member 300 to provide the collected or diffused light to the display member DM. The light collection or diffusion member 500 may include one of a plurality of sheets. The plurality of sheets may include a diffusion sheet, a prism sheet, and a protection sheet. The diffusion sheet may diffuse the light provided from the optical member 300. The prism sheet may be above the diffusion sheet to collect the light diffused by the diffusion sheet in an upward direction perpendicular to the plane. The protection sheet may protect prisms of the prism sheet against external friction. The embodiments of the inventive concept are not limited to the kind and number of sheets provided in the light collection or diffusion member 500. Also, according to another embodiment of the inventive concept, the light collection or diffusion member 500 may be omitted.

The mold frame 600 is between the optical member 300 and the display member DM. When the display apparatus 1000 includes the light collection or diffusion member 500, the light collection or diffusion member 500 is between the mold frame 600 and the display member DM (e.g., as shown in FIG. 2), but is not limited thereto. In another embodiment of the inventive concept, the light collection or diffusion member 500 may be below the mold frame 600.

According to this embodiment, the mold frame 600 has a frame shape. Particularly, the mold frame 600 may correspond to an edge area on the top surface of the optical member 300. The display member DM may be seated on the mold frame 600. The mold frame 600 fixes the display member DM and the backlight unit BLU.

The accommodation member 700 may be on the lowermost end of the display apparatus 1000 to accommodate the backlight unit BLU. The accommodation member 700 includes a bottom part 710 and a plurality of sidewalls 720 connected to the bottom part 710. According to an embodiment of the inventive concept, the light source LS may be on one inner surface of the plurality of sidewalls 720 of the accommodation member 700. The accommodation member 700 may be made of a rigid metal.

Figure 3:
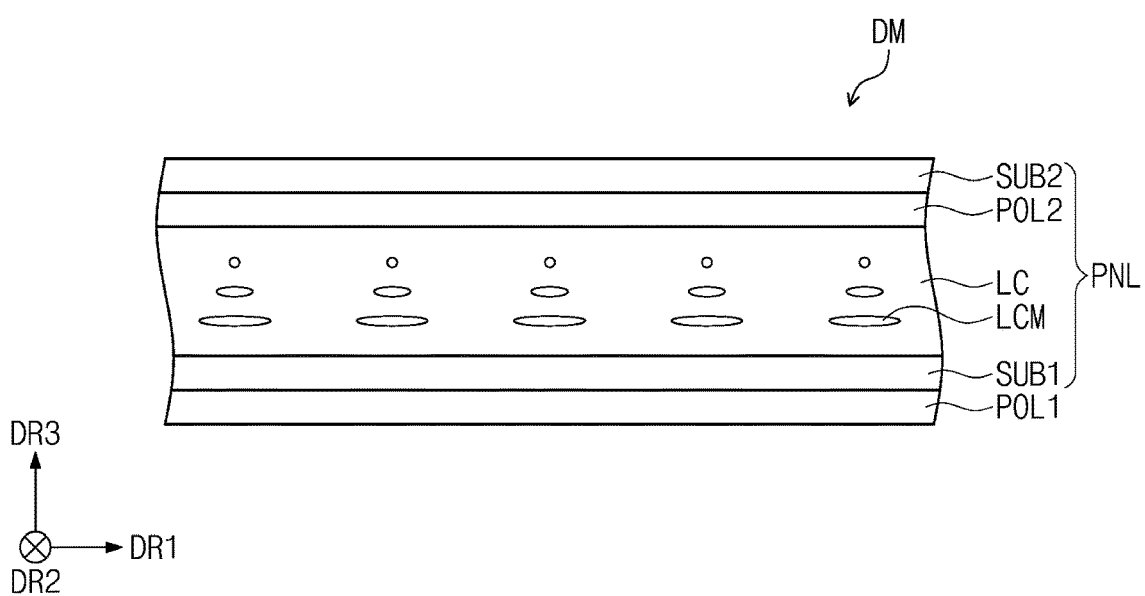
FIG. 3 is an enlarged cross-sectional view of a display member of FIG. 2.

FIG. 3 is an enlarged cross-sectional view of the display member DM of FIG. 2.

Referring to FIG. 3, the display member DM includes a polarization layer POL1 and a display panel PNL. The first polarization layer POL1 is between the display panel PNL and the backlight unit BLU to polarize components of light provided from the backlight unit BLU. The first polarization layer POL1 may have a transmission axis having a predetermined direction.

The display panel PNL is on the first polarization layer POL1 to display an image through the display area DA. The display panel PNL may be a light-receiving type display panel. For example, according to an embodiment of the inventive concept, the display panel PNL may be a liquid crystal display panel.

The display panel PNL includes a first substrate SUB1, a second polarization layer POL2, a second substrate SUB2, and a liquid crystal layer LC.

The first substrate SUB1 is on the first polarization layer POL1. The first substrate SUB1 may be made of a material having high light transmissivity to easily transmit light provided from the backlight unit BLU. For example, the first substrate SUB1 may include a transparent substrate, a transparent plastic substrate, and/or a transparent film.

At least one pixel area and a non-pixel area adjacent to the pixel area may be defined on the first substrate SUB1 on the plane. In this embodiment, the pixel area may be provided in plurality, and the non-pixel area may be defined between the pixel areas.

Pixels may be on the pixel areas of the first substrate SUB1. The pixels may include a plurality of pixel electrodes and a plurality of thin film transistors electrically connected one-to-one to corresponding to the pixel electrodes. The thin film transistors may be respectively connected to the pixel electrodes to switch a driving signal provided to each of the pixel electrodes.

The second substrate SUB2 is on the first substrate SUB1 to face the first substrate SUB1. A liquid crystal layer LC may be between the second substrate SUB2 and the first substrate SUB1. The liquid crystal layer LC includes a plurality of liquid crystal molecules (LCM) arranged in a set or predetermined direction.

The second substrate SUB2 may include a common electrode for generating electric fields, which control an arrangement of the liquid crystal molecules (LCM) together with the pixel electrodes. The display member DM drives the liquid crystal layer LC to display an image in an upward direction, e.g., in the third direction DR3.

A driving chip providing a driving signal to the display member DM, a tape carrier package on which the driving chip is mounted, and a printed circuit board electrically connected to the display panel PNL through the tape carrier package may be on the display member DM.

The second polarization layer POL2 is between the liquid crystal layer LC and the second substrate SUB2. However, the present disclosure is not limited to the position of the second polarization layer POL2, which is illustrated in FIG. 3. For example, according to another embodiment of the inventive concept, the second polarization layer POL2 may be on the second substrate SUB2.

In this embodiment, the second polarization layer POL2 may be a wire grid polarizer. The second polarization layer POL2 may include a plurality of nanowires made of a metal. However, an embodiment of the inventive concept is not limited to a specific shape and material of the second polarization layer POL2.

The second polarization layer POL2 may have an absorption axis having a set or predetermined direction. When a display mode of the display apparatus 1000 is in a bright state, the second polarization layer POL2 transmits light. When the display mode of the display apparatus 1000 is in a dark state, the second polarization layer POL2 absorbs light.

According to this embodiment, an angle defined by the transmission axis of the first polarization layer POL1 and the absorption axis of the second polarization layer POL2 may be determined according to the arrangement of the liquid crystal molecules LCM. For example, the transmission axis of the first polarization layer POL1 may be perpendicular to the absorption axis of the second polarization layer POL2 on the plane.

Figure 4:
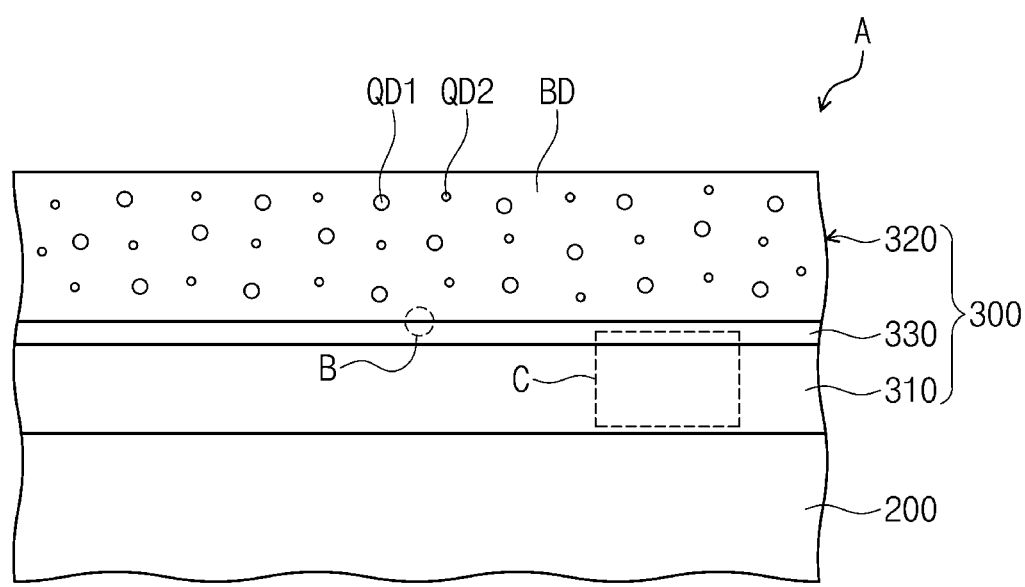
FIG. 4 is an enlarged view of a region A of FIG. 2.

FIG. 4 is an enlarged view of a region A of FIG. 2.

Referring to FIG. 4, the optical member 300 according to this embodiment includes a low refractive index layer 310, a wavelength conversion layer 320, and an inorganic layer 330.

The low refractive index layer 310 is on the top surface of the light guide member 200. At least a portion of the low refractive index layer 310 has a refractive index less than that of the light guide member 200. For example, a portion of the low refractive index layer 310 has a refractive index of about 1.15 to about 1.35. The low refractive index layer 310 generates a difference in refractive index on an interface between the low refractive index layer 310 and the light guide member 200 to allow light provided from the light source LS to the light guide member 200 to be totally reflected within the light guide member 200.

According to this embodiment, an existing air gap formed between the wavelength conversion layer 320 and the light guide member 200 may be replaced with the low refractive index layer 310. Thus, although the light guide member 200 and the wavelength conversion layer 320 are coupled to each other by the low refractive index layer 310, since the difference in refractive index on the interface between the low refractive index layer 310 and the light guide member 200 occurs, the light provided to the light guide member 200 may be totally reflected to be guided.

The wavelength conversion layer 320 is on the low refractive index layer 310. The wavelength conversion layer 320 may convert a wavelength band of the incident light.

The wavelength conversion layer 320 may include a plurality of quantum dots QD1 and QD2 and a binding member BD. The wavelength conversion layer 320 may have a form in which the quantum dots QD1 and QD2 are dispersed in the binding member BD.

The binding member BD may have a light transmitting property. In this embodiment, the binding member BD may include an organic material.

Each of the quantum dots QD1 and QD2 may absorb at least a portion of the incident light to emit light having a special color or transmit the light as it is.

When the light incident into the wavelength conversion layer 320 has energy that is sufficient to excite the quantum dots QD1 and QD2, the quantum dots QD1 and QD2 absorb at least a portion of the incident light to allow the light to be excited and then to stabilize the light, thereby emitting light of a specific color. On the other hand, when the incident light has energy in which it is difficult to excite the quantum dots QD1 and QD2, the incident light may be transmitted as it is through the wavelength conversion layer 320 and thus be visible from the outside.

According to this embodiment, the quantum dots QD1 and QD2 include first quantum dots QD1 and second quantum dots QD2. The first quantum dots QD1 may absorb the first light to convert the first light into second light having a second wavelength band. The second wavelength band has a center wavelength greater than that of the first wavelength band. For example, the second wavelength band may range from about 640 nm to about 780 nm. That is, each of the first quantum dots QD1 may substantially convert blue light into red light.

Each of the second quantum dots QD2 may absorb the first light to convert the first light into third light having a third wavelength band. The third wavelength band has a center wavelength greater than that of the first wavelength band and less than that of the second wavelength band. For example, the third wavelength band may range from about 480 nm to about 560 nm. That is, each of the second quantum dots QD2 may substantially convert blue light into green light.

According to this embodiment, a wavelength of light generated by the corresponding particles may be determined according to a particle size of each of the quantum dots QD1 and QD2. Substantially, as each of the particles increases in size, light having a longer wavelength is generated. Also, as each of the particles decreases in size, light having a shorter wavelength is generated. According to this embodiment, each of the first quantum dots QD1 may have a size greater than that of each of the second quantum dots QD2. The light emitted from the quantum dots QD1 and QD2 of the wavelength conversion layer 320 may be emitted in various directions.

The wavelength conversion layer 320 may further include scatterers. The scatterers may have a form in which the first quantum dots QD1 and the second quantum dots QD2 are mixed together with each other.

Also, according to another embodiment of the inventive concept, the wavelength conversion layer 320 may include other conversion particles except for the quantum dots QD1 and QD2. For example, each of the conversion particles may be a phosphor.

Also, according to another embodiment of the inventive concept, the wavelength conversion layer 320 may further include conversion particles in addition to the first and second quantum dots QD1 and QD2. Each of the conversion particles may be a phosphor or a third quantum dot. A wavelength band of light generated by the phosphor and the third quantum dot may be different from the wavelength band of the light generated by the above-described first and second quantum dots QD1 and QD2. The embodiments of the inventive concept are not limited to kinds and number of materials contained in the wavelength conversion layer 320.

The wavelength conversion layer 320 has a refractive index greater than that of the light guide member 200. For example, the wavelength conversion layer 320 may have a refractive index of about 1.65 or more.

The inorganic layer 330 is between the low refractive index layer 310 and the wavelength conversion layer 320. The inorganic layer 330 includes an inorganic material. For example, the inorganic layer 330 according to an embodiment of the inventive concept may include silicon nitride (SiNx) or silicon oxide (SiOx). However, the embodiment of the inventive concept is not particularly limited to the material contained in the inorganic layer 330.

According to an embodiment of the inventive concept, the inorganic layer 330 may have a thickness less than that of each of the low refractive index layer 310 and the wavelength conversion layer 320. The inorganic layer 330 may adjust amounts of quantum dots QD1 and QD2 and binding member BD of the wavelength conversion layer 320, which are permeated into the low refractive index layer 310. Hereinafter, this will be described in more detail with reference to FIGS. 5 to 7.

Figure 5:
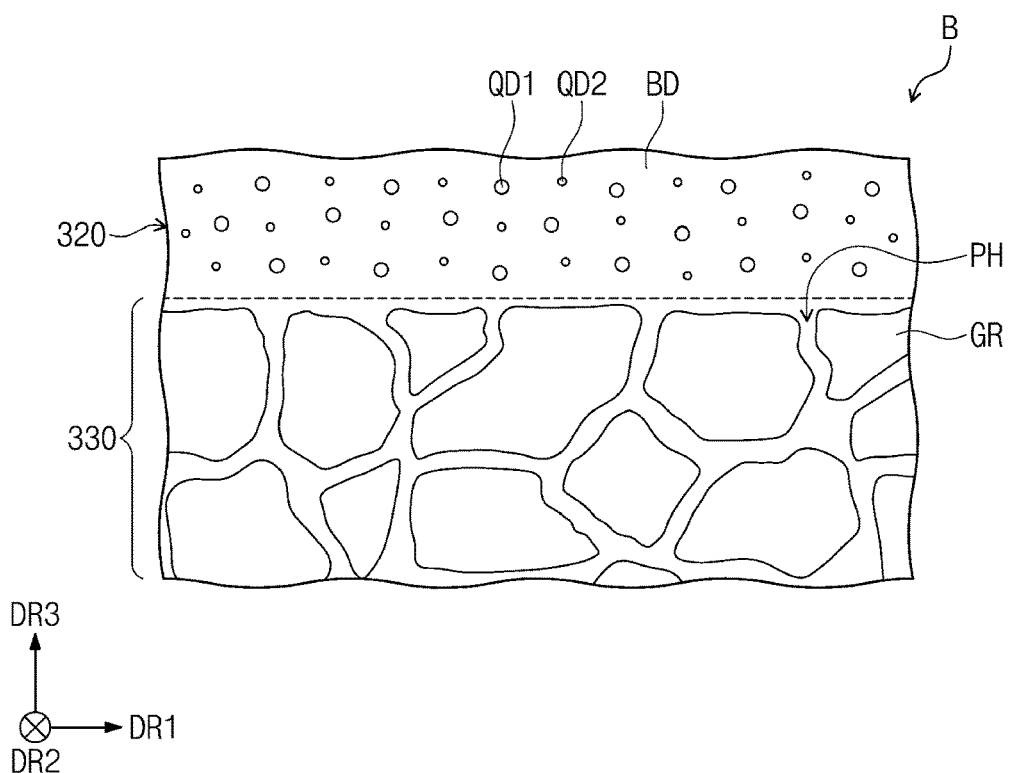
FIG. 5 is an enlarged cross-sectional view of a region B of FIG. 4.
Figure 6:
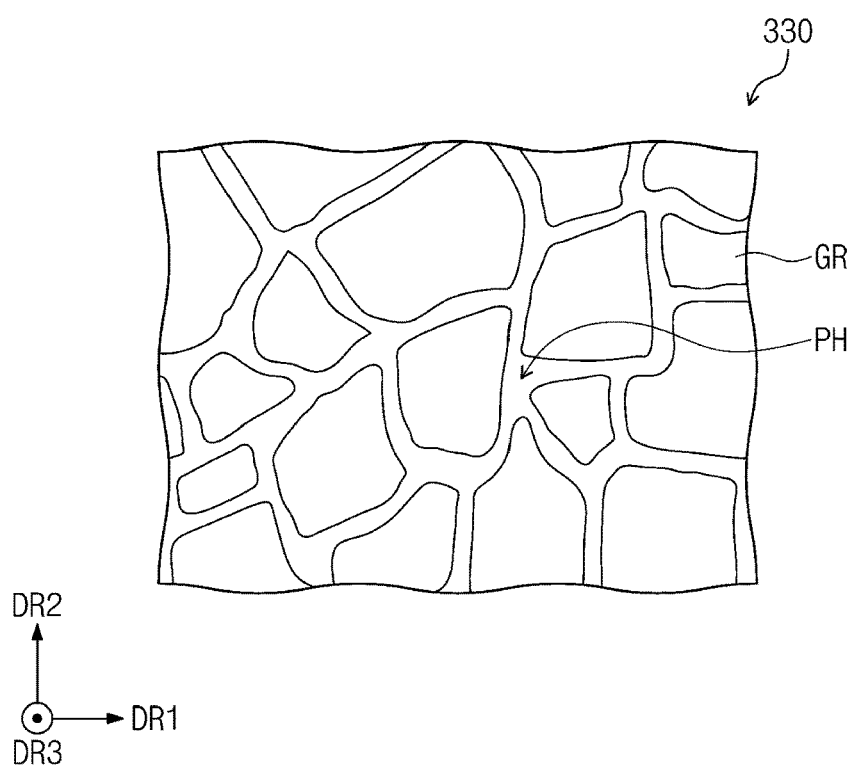
FIG. 6 is an enlarged plan view of an inorganic layer of FIG. 5.

FIG. 5 is an enlarged cross-sectional view of a region B of FIG. 4, and FIG. 6 is an enlarged plan view of an inorganic layer of FIG. 5.

Referring to FIGS. 5 and 6, the inorganic layer 330 includes a plurality of inorganic crystal particles GR. For example, each of the inorganic crystal particles GR may be silicon nitride (SiNx) and/or silicon oxide (SiOx).

According to this embodiment, an empty space may be defined between the inorganic crystal particles. The empty space is defined as a pin hole PH (grain boundary). The pin hole PH may vary in size and number according to a kind of inorganic crystal particles GR and a thickness of the inorganic layer 330.

Figure 7:
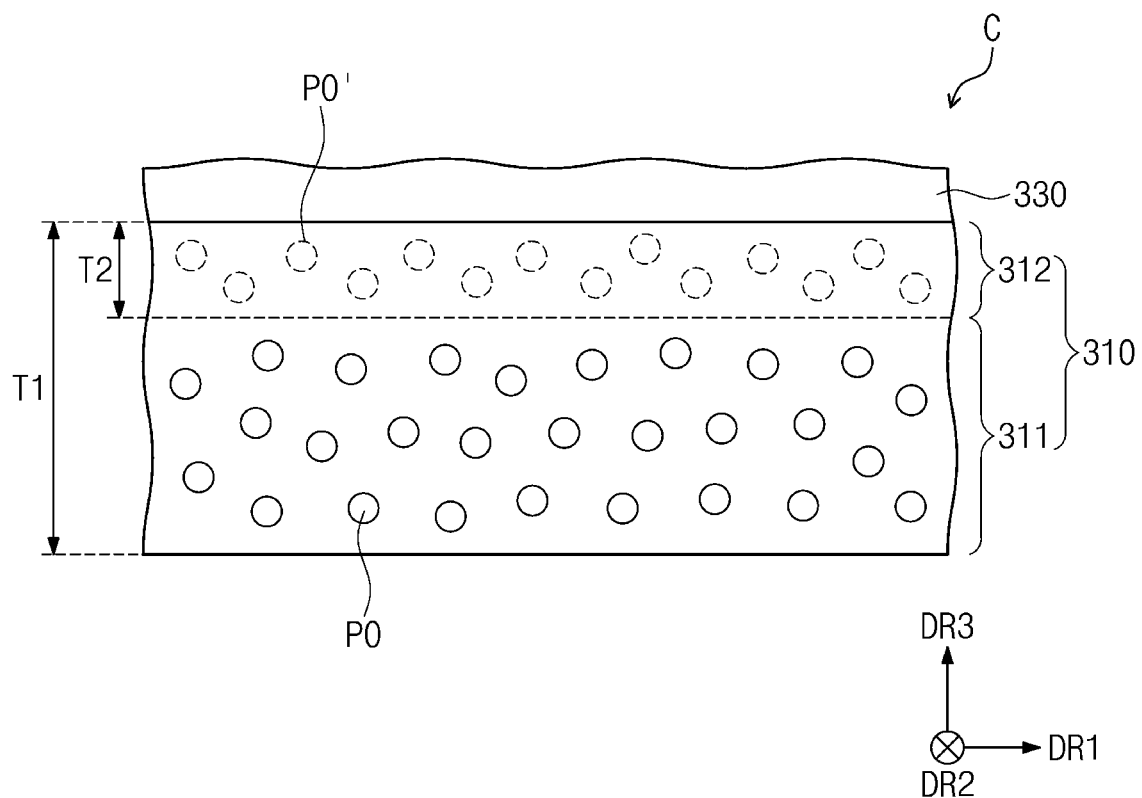
FIG. 7 is an enlarged cross-sectional view of a region C of FIG. 4.

FIG. 7 is an enlarged cross-sectional view of a region C of FIG. 4.

Referring to FIG. 7, the low refractive index layer 310 may include plurality of pores PO and PO'. The low refractive index layer 310 may include a volatile material. As the volatile material is volatilized in the form of a gas, the plurality of pores PO and PO' may be provided in the low refractive index layer 310. However, the embodiment of the inventive concept is not particularly limited in the formation method of the pores PO and PO' in the low refractive index layer 310. The low refractive index layer 310 according to another embodiment of the inventive concept may be made of acrylic and/or siloxane-based material including a plurality of silica capsules.

According to this embodiment, the refractive index of the low refractive index layer 310 may be controlled according to a volume ratio occupied by the pores PO in the low refractive index layer 310. For example, as the number of pores PO per unit volume within the low refractive index layer 310 increases, the refractive index of the low refractive index layer 310 may be reduced. The volume ratio occupied by the pores PO may be the volume of the pores PO in the low refractive index layer 310 compared to the volume of the low refractive index layer 310.

According to this embodiment, the quantum dots QD1 and QD2 or the binding member BD of the wavelength conversion layer 320 may be permeated into the low refractive index layer 310 through the pin holes PH of the inorganic layer 330. The quantum dots QD1 and QD2 or the binding member BD of the wavelength conversion layer 320, which are permeated into the low refractive index layer 310, may be filled into the pores PO' of the low refractive index layer 310. The empty space of each of the pores PO' may be filled with the quantum dots QD1 and QD2 or the binding member BD of the wavelength conversion layer 320, and thus, the number of pores PO per unit volume may be reduced. That is, the refractive index of the low refractive index layer 310 may increase.

According to this embodiment, a volume ratio occupied by the pores PO within the low refractive index layer 310 increases as being closer to the light guide member 200. That is, the quantum dots QD1 and QD2 and the binding member BD of the wavelength conversion layer 320 may be permeated into a portion of an upper portion of the low refractive index layer 310. Particularly, the low refractive index layer 310 includes a first portion 311 and a second portion 312. The first portion 311 is on the light guide member 200 (see FIG. 4). The first portion 311 includes the plurality of pores PO. The first portion 311 has a first refractive index.

The second portion 312 is on the first portion 311. The quantum dots QD1 and QD2 and the binding member BD may be filled into the pores PO' of the second portion 312. That is, the second portion 312 has a second refractive index greater than that of the first refractive index. The second refractive index is less than or equal to that of the wavelength conversion layer 320.

According to this embodiment, a ratio of a thickness of the second portion 312 to the total thickness of the low refractive index layer 310 may range from about 0.3 to about 0.5.

As described above, the inorganic layer 330 may adjust an amount of wavelength conversion layer 320 permeated into the low refractive index layer 310. As an amount of wavelength conversion layer 320 permeated into the low refractive index layer 310 increases, coupling force between the low refractive index layer 310 and the wavelength conversion layer 320 may increase.

According to this embodiment, the inorganic layer 330 may have a thickness of about 700 Å to about 1,500 Å. When the inorganic layer 330 has a thickness less than about 700 Å, the coupling force between the low refractive index layer 310 and the wavelength conversion layer 320 may be insufficient, and thus, the wavelength conversion layer 320 may be delaminated from the low refractive index layer 310. Alternatively, when the inorganic layer 300 has a thickness of 1500 Å or more, the refractive index of the low refractive index layer 310 may be increased to reduce a difference in refractive indexes between the light guide member 200 and the low refractive index layer 310. In this case, light provided to the light guide member 200 may not be guided and thus be discharged to the wavelength conversion layer 320 through the low refractive index layer 310.

According to this embodiment, since the amount of wavelength conversion layer permeated into the low refractive index layer 310 is adjusted by the inorganic layer 330, the difference in refractive indexes between the low refractive index layer 310 and the light guide member 200 may be prevented from being reduced, and also, the coupling force between the low refractive index layer 310 and the wavelength conversion layer 320 may be increased. That is, according to an embodiment, the light guide characteristics may be prevented from being deteriorated, and also, the display apparatus 1000 may be improved in durability.

Figure 8:
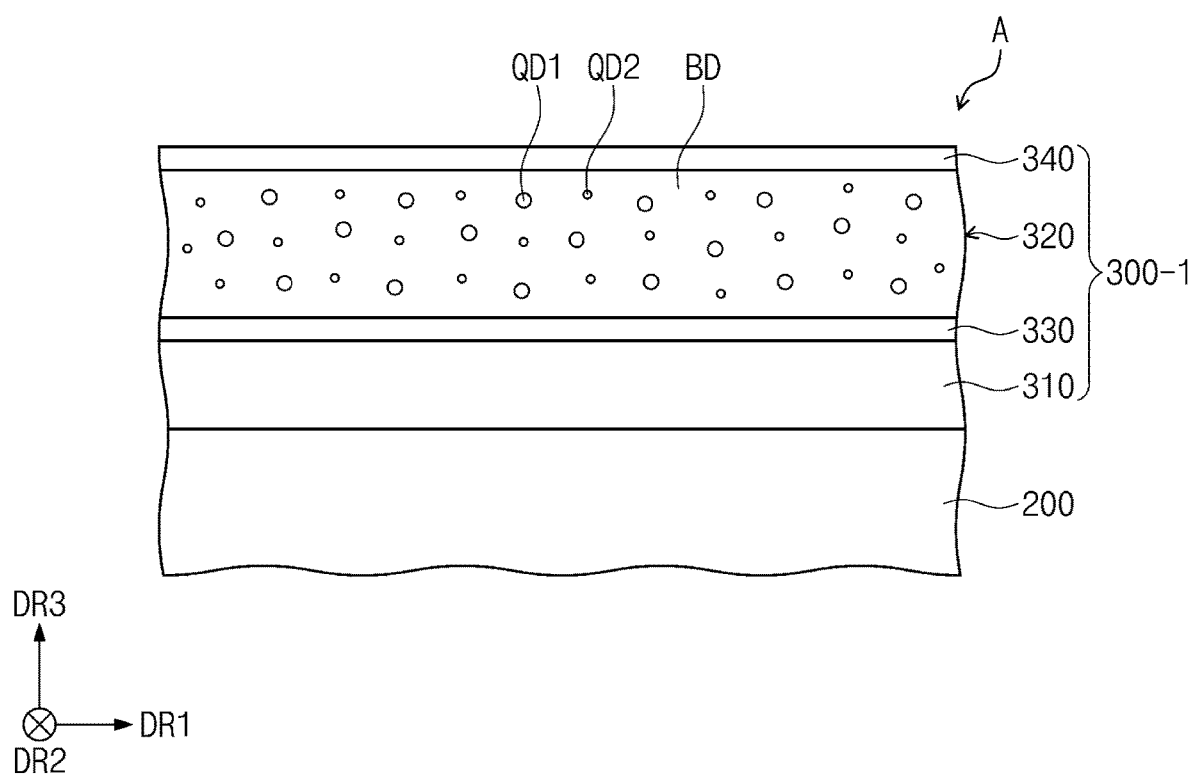
FIG. 8 is a cross-sectional view of an optical member according to another embodiment of the inventive concept.

FIG. 8 is a cross-sectional view of an optical member according to another embodiment of the inventive concept.

For convenience of description, differences between this embodiment and the foregoing embodiments will be mainly described, and omitted descriptions will be derived from the foregoing embodiments. Also, the same reference symbol is given to the same component, and duplicated descriptions with respect to the component will be omitted.

Referring to FIG. 8, an optical member 300-1 according to an embodiment of the inventive concept further includes a barrier layer 340 on the wavelength conversion layer 320. The barrier layer 340 may prevent the quantum dots QD1 and QD2 of the wavelength conversion layer 320 from being degraded by external air or moisture. The barrier layer 340 may include an inorganic material. For example, the barrier layer 340 may include silicon nitride (SiNx) and/or silicon oxide (SiOx).

Figure 9:
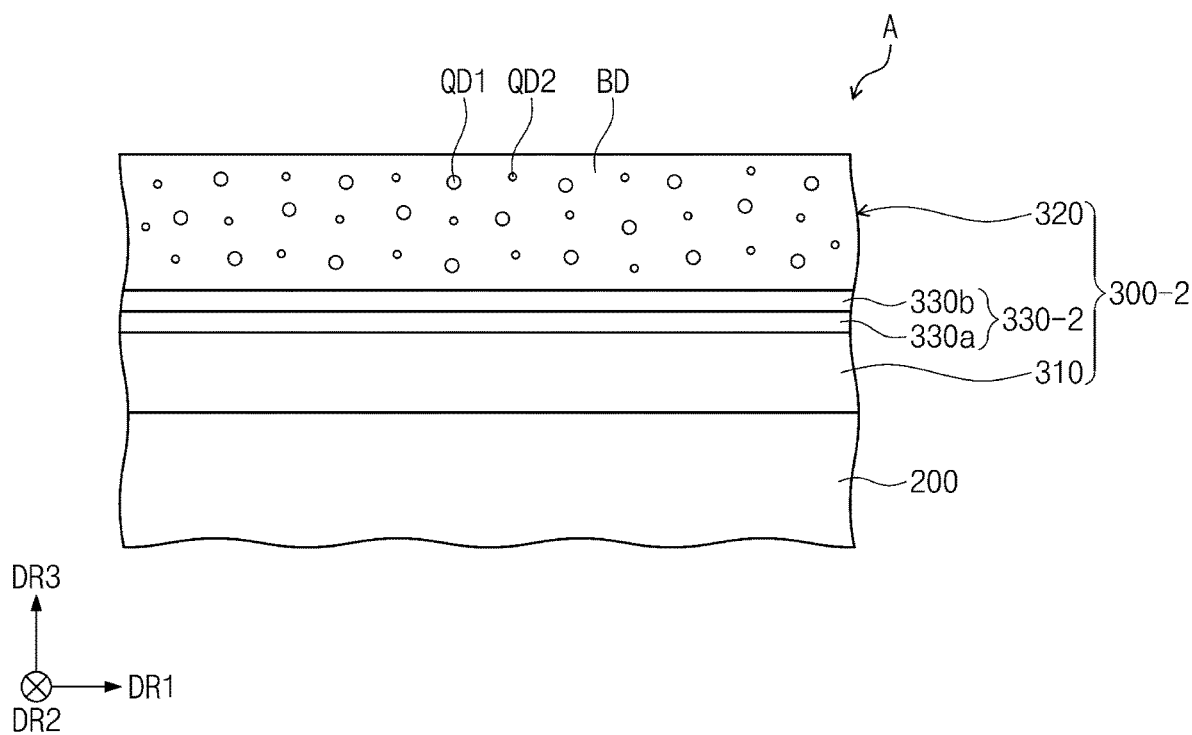
FIG. 9 is a cross-sectional view of an optical member according to another embodiment of the inventive concept.

FIG. 9 is a cross-sectional view of an optical member according to another embodiment of the inventive concept.

For convenience of description, differences between this embodiment and the foregoing embodiments will be mainly described, and omitted descriptions will be derived from the foregoing embodiments. Also, the same reference symbol is given to the same component, and duplicated descriptions with respect to the component will be omitted.

Referring to FIG. 9, an inorganic layer 330-2 according to another embodiment of the inventive concept may be provided in plurality. The plurality of inorganic layers 330-2 include a first inorganic layer 330a and a second inorganic layer 330b.

The first inorganic layer 330a is on the low refractive index layer 310. The second inorganic layer 330b is on the first inorganic layer 330a. Each of the first inorganic layer 330a and the second inorganic layer 330b according to this embodiment may have a thickness of about 200 Å to about 600 Å.

The first inorganic layer 330a may include a material different from that of the second inorganic layer 330b. For example, the first inorganic layer 330a may include a material having a higher affinity for the low refractive index layer 310 than the second inorganic layer 330b. In this case, the coupling force between the first inorganic layer 330a and the low refractive index layer 310 may increase.

When crystal particles contained in the first inorganic layer 330a are different from those contained in the second inorganic layer 330b, pin holes defined in the first inorganic layer 330a may be defined at positions different from those of pin holes defined in the second inorganic layer 330b. In this case, although the inorganic layer 330-2 may be relatively thin, an amount of wavelength conversion layer 320 permeated into the low refractive index layer 310 may be effectively reduced.

However, the embodiments of the inventive concept are not limited thereto. According to another embodiment of the inventive concept, the first inorganic layer 330a and the second inorganic layer 330b may include the same material. After the primary deposition of the first inorganic layer 330a is completed, when the secondary deposition of the second inorganic layer 330b is performed with a time difference, even though the first inorganic layer 330a and the second inorganic layer 330b are made of the same material, an interface may be provided between the first inorganic layer 330a and the second inorganic layer 330b. In this case, pin holes defined in the inorganic layers 330a and 330b may be defined at positions different from each other.

Figure 10:
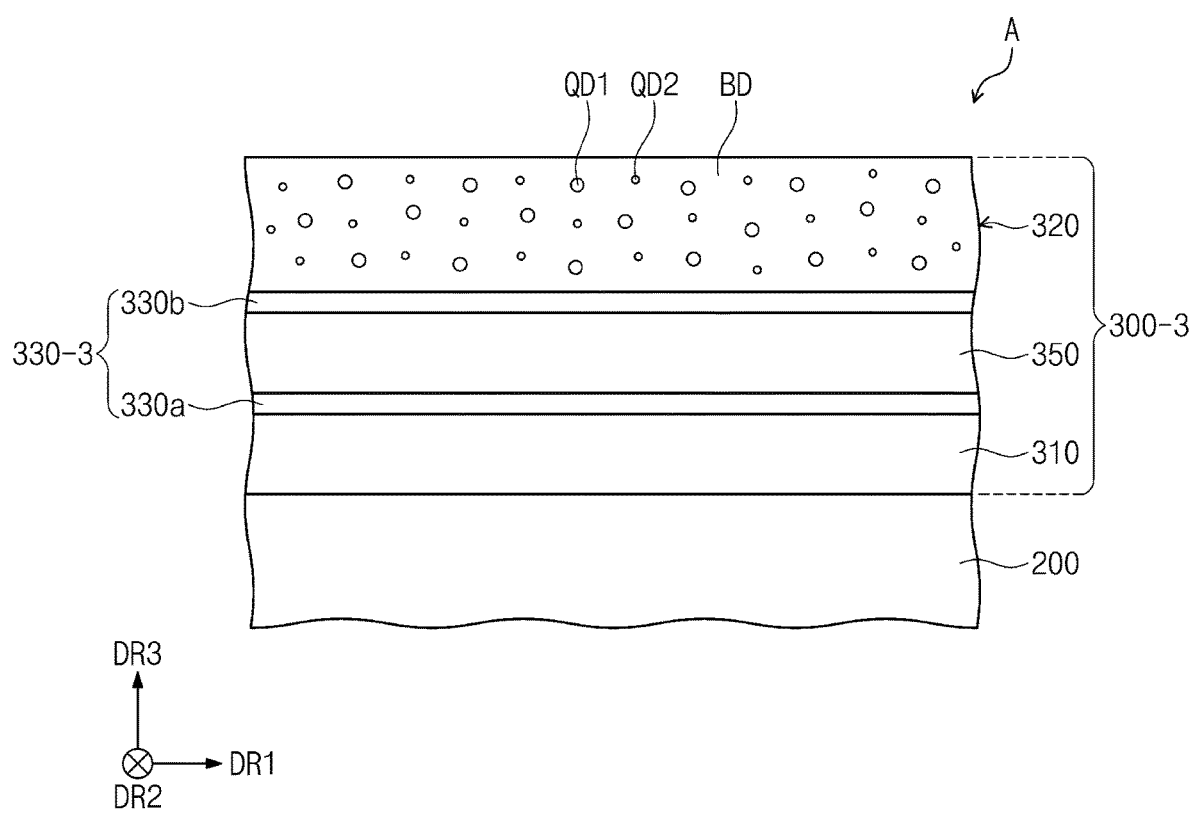
FIG. 10 is a cross-sectional view of an optical member according to another embodiment of the inventive concept.

FIG. 10 is a cross-sectional view of an optical member according to another embodiment of the inventive concept.

For convenience of description, differences between this embodiment and the foregoing embodiments will be mainly described, and omitted descriptions will be derived from the foregoing embodiments. Also, the same reference symbol is given to the same component, and duplicated descriptions with respect to the component will be omitted.

Referring to FIG. 10, an optical member 300-3 according to an embodiment of the inventive concept further includes a sub low refractive index layer 350. The inorganic layer 330-3 includes a first inorganic layer 330a and a second inorganic layer 330b.

The first inorganic layer 330a is on the low refractive index layer 310. The sub low refractive index layer 350 is on the first inorganic layer 330a. The second inorganic layer 330b is on the sub low refractive index layer 350. The wavelength conversion layer 320 is on the second inorganic layer 330b.

The sub low refractive index layer 350 according to an embodiment of the inventive concept has the same configuration and characteristic as those of the above-described low refractive index layer 310. According to this embodiment, since each of the first inorganic layer 330a and the second inorganic layer 330b has a relatively low thickness, even though the wavelength conversion layer 320 is permeated into the low refractive index layer 310 and the second inorganic layer 330b, the refractive index of the low refractive index layer 310 contacting the light guide member 200 may not increase. That is, the phenomenon in which the light guide characteristics are deteriorated may be effectively prevented.

Figure 11:
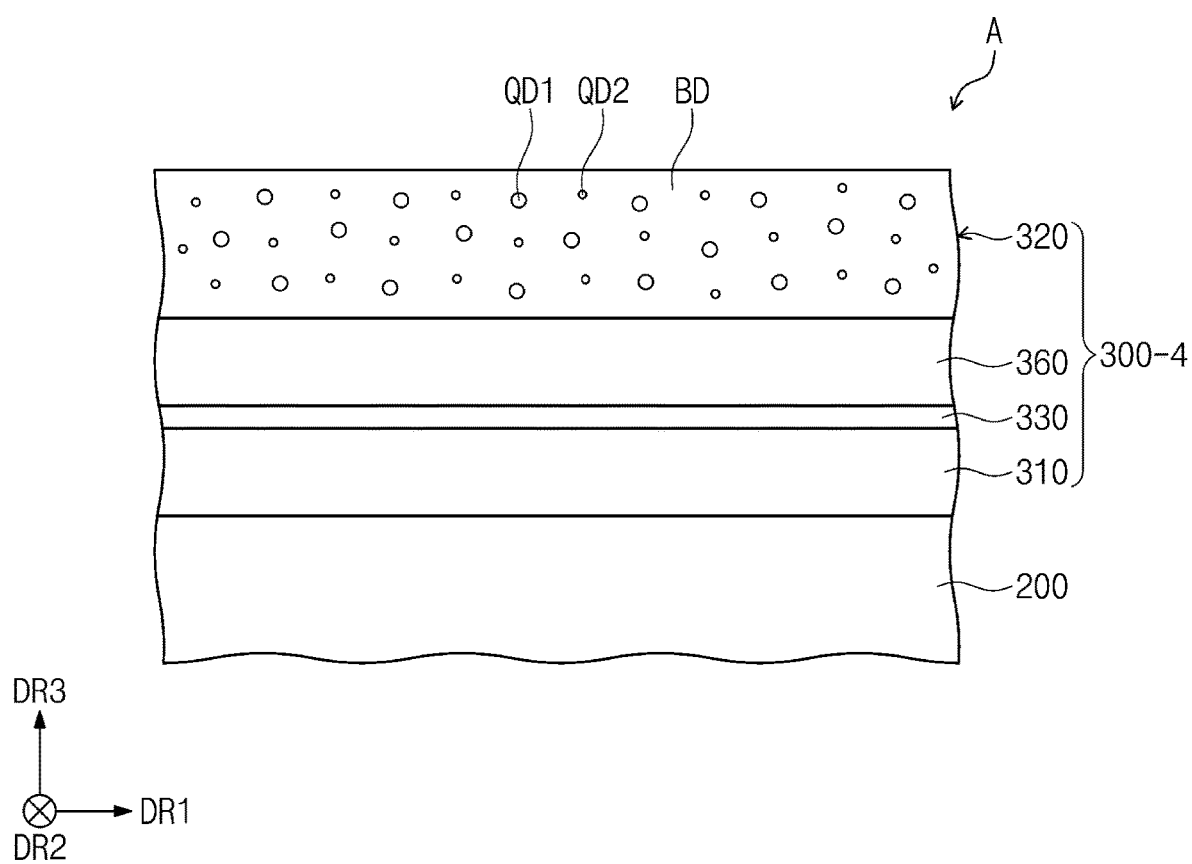
FIG. 11 is a cross-sectional view of an optical member according to another embodiment of the inventive concept.

FIG. 11 is a cross-sectional view of an optical member according to another embodiment of the inventive concept.

For convenience of description, differences between this embodiment and the foregoing embodiments will be mainly described, and omitted descriptions will be derived from the foregoing embodiments. Also, the same reference symbol is given to the same component, and duplicated descriptions with respect to the component will be omitted.

Referring to FIG. 11, an optical member 300-4 according to an embodiment of the inventive concept further includes an organic layer 360. The organic layer 360 is between the inorganic layer 330 and the wavelength conversion layer 320.

The organic layer 360 includes an organic material. For example, the organic layer 360 may include the same material as the binding material BD of the wavelength conversion layer 320. The organic layer 360 may not include the quantum dots QD1 and QD2.

According to this embodiment, the organic layer 360, which does not include the quantum dots QD1 and QD2, may be permeated into the inorganic layer 330 and then be filled into the pores of the low refractive index layer 310. That is, the quantum dots QD1 and QD2 may not be permeated into the low refractive index layer 310. Thus, the deterioration of the optical characteristics of the display apparatus due to the dispersion or degradation of the quantum dots QD1 and QD2 may be prevented.

Figure 12:
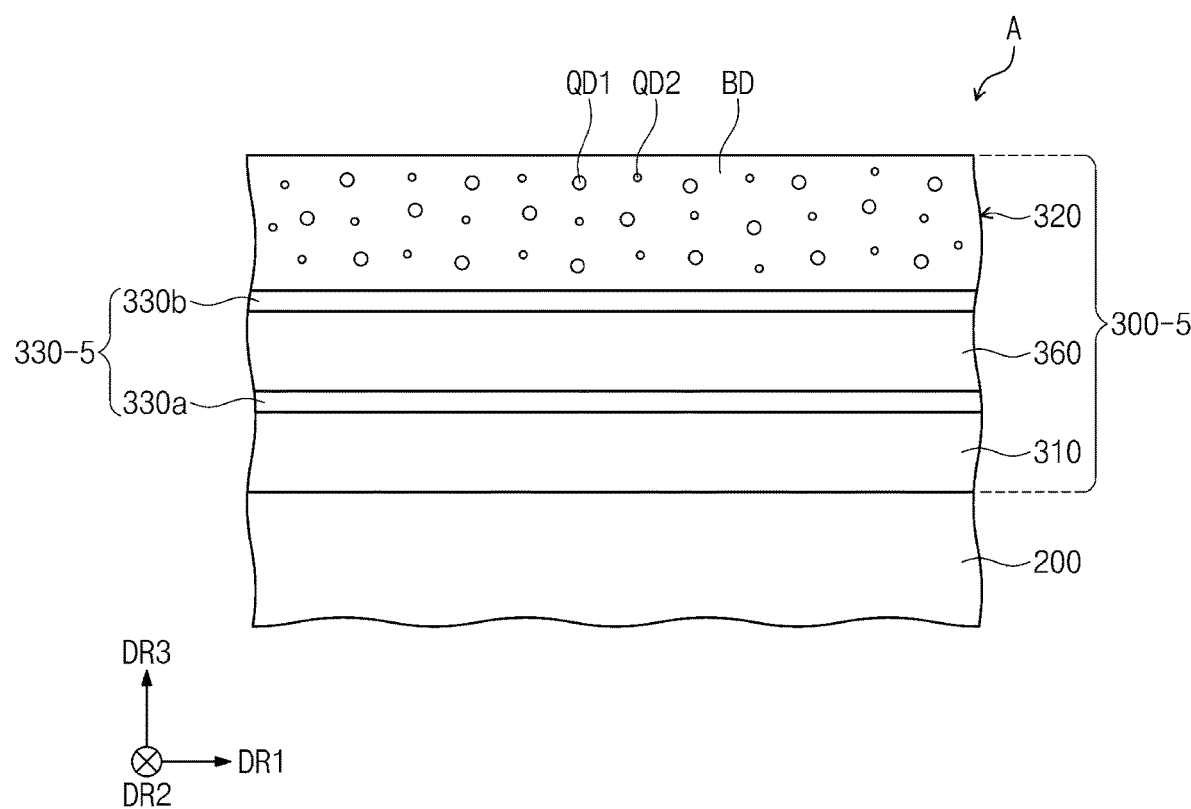
FIG. 12 is a cross-sectional view of an optical member according to another embodiment of the inventive concept.

FIG. 12 is a cross-sectional view of an optical member according to another embodiment of the inventive concept.

For convenience of description, differences between this embodiment and the foregoing embodiments will be mainly described, and omitted descriptions will be derived from the foregoing embodiments. Also, the same reference symbol is given to the same component, and duplicated descriptions with respect to the component will be omitted.

Referring to FIG. 12, an optical member 300-5 according to an embodiment of the inventive concept further includes an organic layer 360. Also, an inorganic layer 330-5 includes a first inorganic layer 330a and a second inorganic layer 330b.

The first inorganic layer 330a is on the low refractive index layer 310. The organic layer 360 is on the first inorganic layer 330a. The second inorganic layer 330b is on the organic layer 360.

After the deposition of the inorganic layers 330a and 330b are completed, stress may be applied to the inorganic layers 330a and 330b outward on a plane due to a difference between a deposition temperature and an actual temperature. On the other hand, since the organic layer 360 and the wavelength conversion layer 320 are condensed through a curing process, the stress may be applied in a central direction on the plane.

According to this embodiment, since the members, to which the stress is applied in directions opposite to each other, are alternately located, the stress applied to the whole optical member 300-5 may be offset. Thus, according to this embodiment, the delamination generated on the interface between the layers of the optical member 300-5 may be prevented or reduced. That is, according to this embodiment, the optical member 300-5 may be improved in durability.

Figure 13:
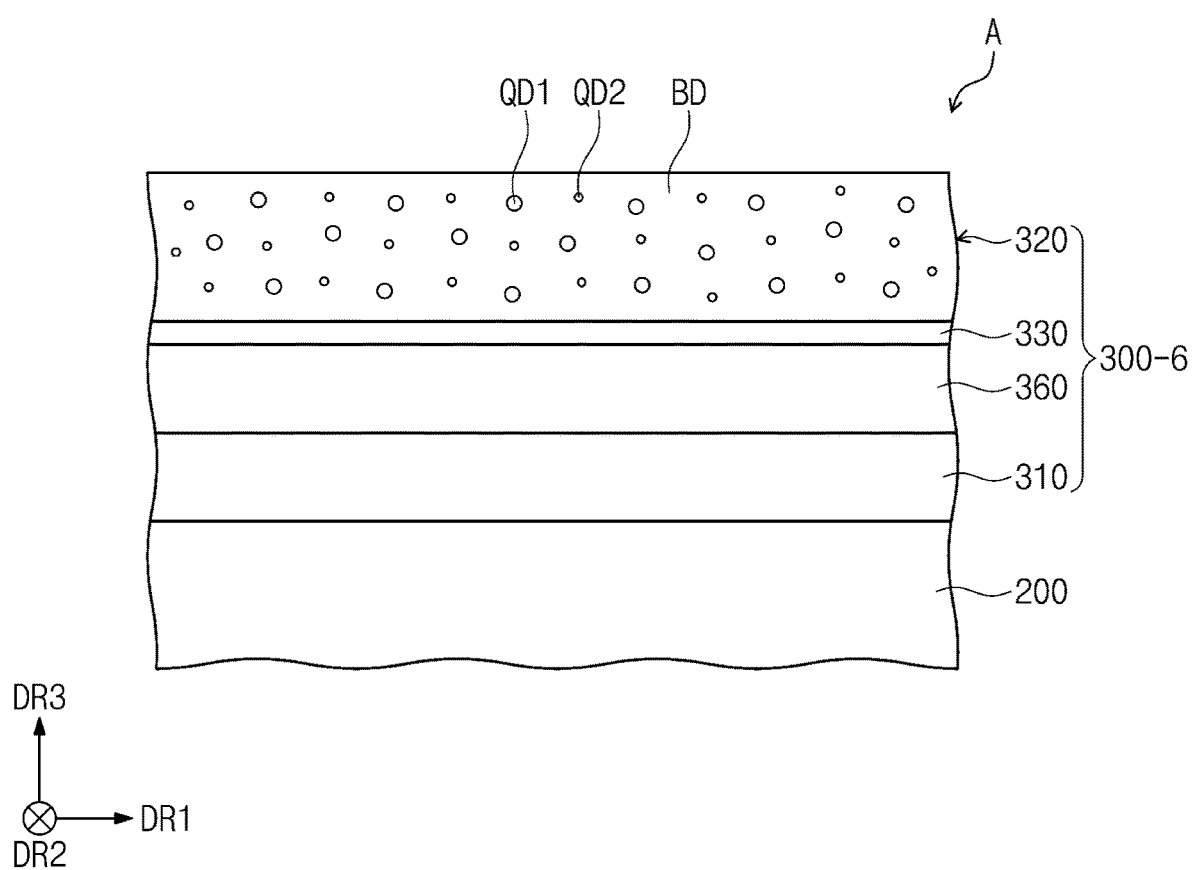
FIG. 13 is a cross-sectional view of an optical member according to another embodiment of the inventive concept.

FIG. 13 is a cross-sectional view of an optical member according to another embodiment of the inventive concept.

For convenience of description, differences between this embodiment and the foregoing embodiments will be mainly described, and omitted descriptions will be derived from the foregoing embodiments. Also, the same reference symbol is given to the same component, and duplicated descriptions with respect to the component will be omitted.

Referring to FIG. 13, an optical member 300-6 according to another embodiment of the inventive concept includes a low refractive index layer 310, an organic layer 360, an inorganic layer 330, and a wavelength conversion layer 320.

The organic layer 360 is on the low refractive index layer 310. The inorganic layer 330 is on the organic layer 360. The wavelength conversion layer 320 is on the inorganic layer 330.

According to this embodiment, the curing rate of the organic layer 360 may quickly increase to prevent the organic layer 360 from being permeated up to the first portion 311 (see FIG. 7) of the low refractive index layer 310. In this case, even though the inorganic layer 330 is not between the organic layer 360 and the low refractive index layer 310, the optical characteristics of the light guide member 200 may not be deteriorated.

According to this embodiment, the inorganic layer 330 may be between the organic layer 360 and the wavelength conversion layer 320 to mitigate the permeation of the quantum dots QD1 and QD2 of the wavelength conversion layer 320 into the organic layer 360. Thus, when the organic layer 360 is permeated into the low refractive index layer 310, the permeation of the quantum dots QD1 and QD2 together with the organic layer 360 into the low refractive index layer 310 may be reduced. That is, the deterioration of the optical characteristics of the display apparatus may be prevented or reduced.

Figure 14:
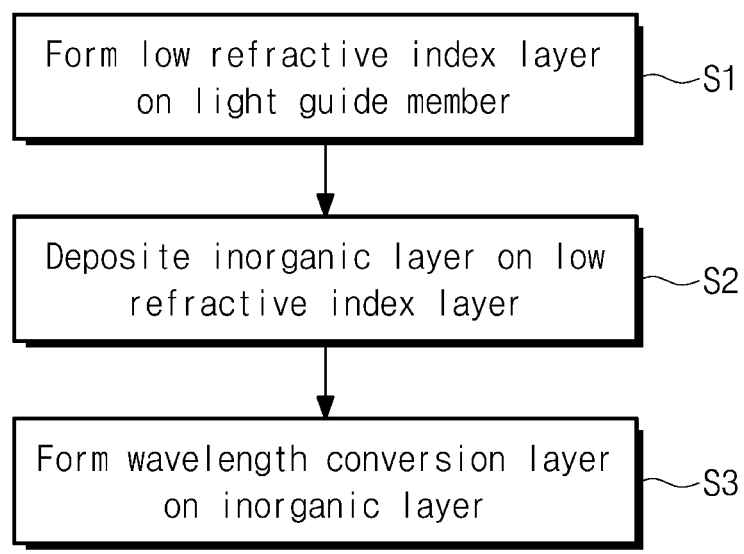
FIG. 14 is a flowchart illustrating a method of manufacturing the optical member according to an embodiment of the inventive concept.

FIG. 14 is a flowchart illustrating a method of manufacturing the optical member according to an embodiment of the inventive concept, and FIGS. 15A to 15D are cross-sectional views illustrating the method of manufacturing the optical member described with respect to the method of FIG. 14.

A method of manufacturing a display apparatus according to an embodiment of the inventive concept includes a process of forming an optical member 300 (see FIG. 4) on a light guide member 200 (see FIG. 4) to assemble the resultant assembly with a prepared display panel.

Hereinafter, the method of manufacturing the optical member 300 (see FIG. 4) according to an embodiment of the inventive concept will be described with reference to FIG. 14 and FIGS. 15A to 15D.

Figure 15A:
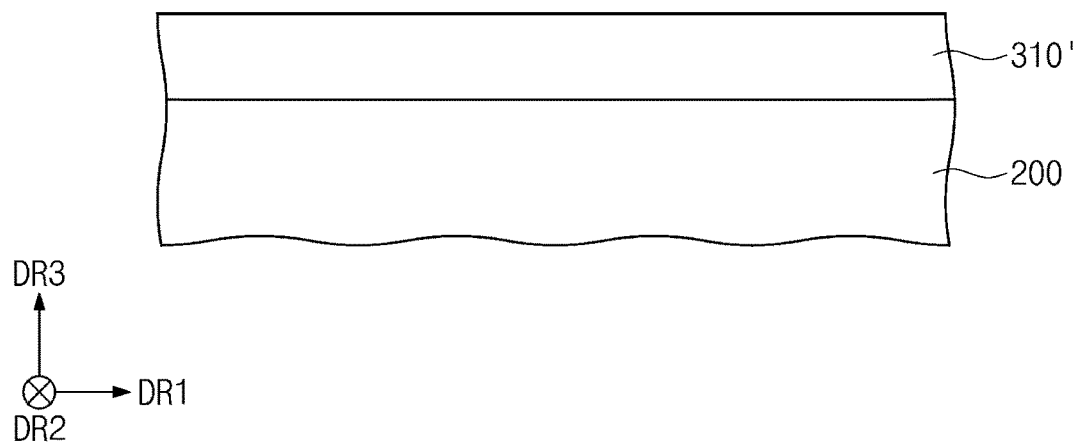
FIGS. 15A to 15D are cross-sectional views illustrating a method of manufacturing the optical member described with respect to the method of FIG. 14.

Referring to FIG. 15A, a preliminary solution 310' is applied to the light guide member 200. The preliminary solution 310' may include a volatile material.

Figure 15B:
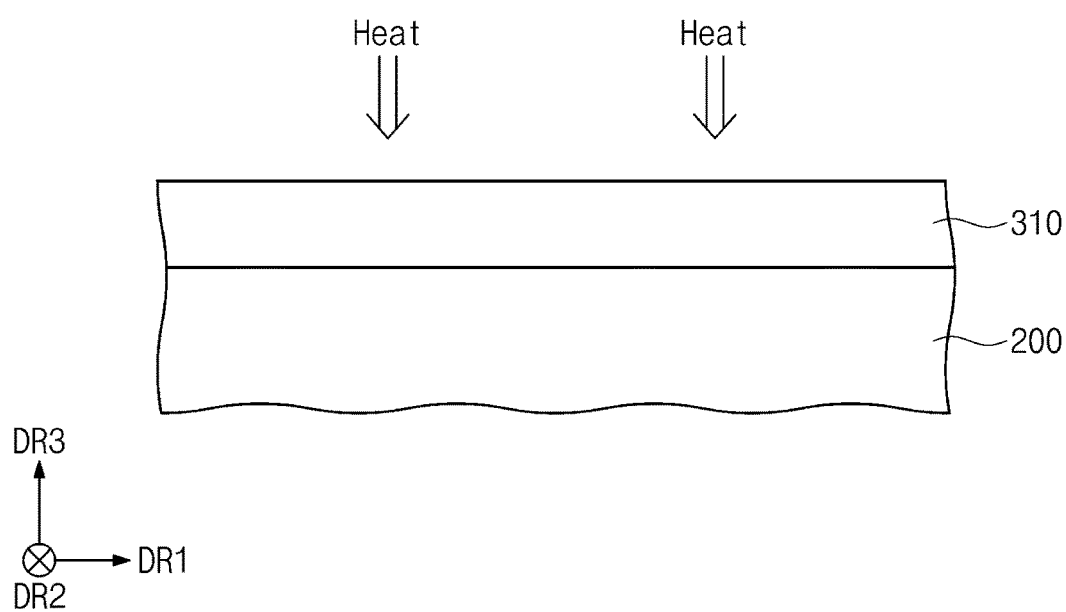

Thereafter, referring to FIG. 15B, the preliminary solution 310' is heated to be dried to form a low refractive index layer 310 (S1). Here, since the volatile material contained in the preliminary solution 310' is volatilized in the form of a gas, a plurality of pores may be formed in the low refractive index layer 310.

However, the process (S1) of forming the low refractive index layer 310 is not limited thereto. For example, according to another embodiment of the inventive concept, the preliminary solution 310' applied to the light guide member 200 may include acrylic or siloxane-based material including a plurality of silica capsules.

A refractive index of the low refractive index layer 310 may be controlled according to a volume ratio occupied by the pores in the low refractive index layer 310. For example, as the number of pores per unit volume within the low refractive index layer 310 increases, the refractive index of the low refractive index layer 310 may be reduced.

Figure 15C:
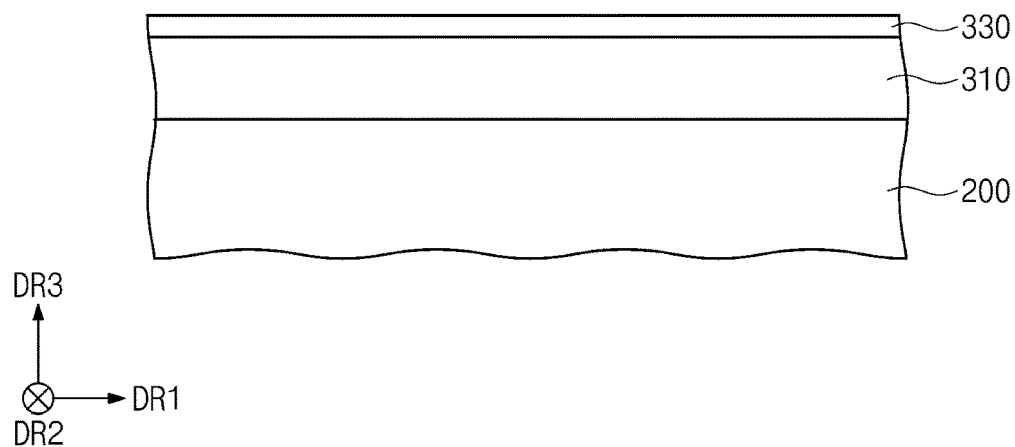

After the low refractive index layer 310 is formed, as illustrated in FIG. 15C, an inorganic layer 330 is formed on the low refractive index layer 310 (S2). The inorganic layer 330 may be formed through a deposition process. The inorganic layer 330 includes a plurality of inorganic crystal particles GR (see FIG. 6). When the inorganic crystal particles GR (see FIG. 6) is deposited on the low refractive index layer 310, a plurality of pin holes may be formed between the inorganic crystal particles. The number of pin holes within the inorganic layer 330 and/or a size of each of the pin holes may increase as a thickness of the inorganic layer 330 is reduced. Here, the thickness of the inorganic layer 330 may be controlled according to a deposition time and temperature of the inorganic layer 330.

Figure 15D:
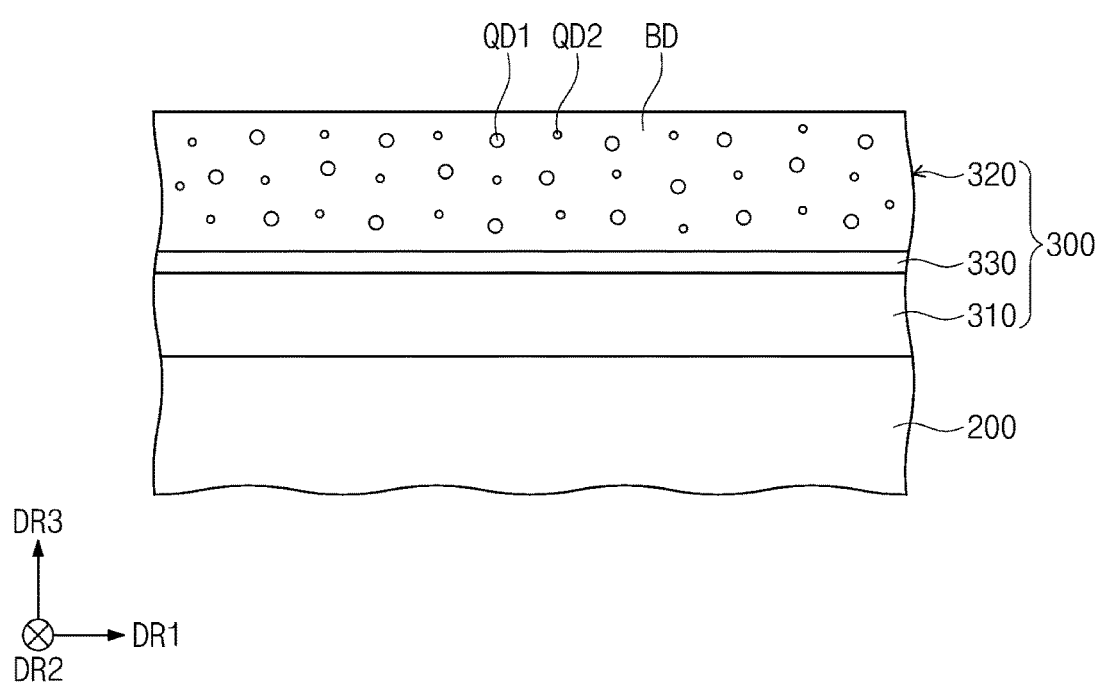

After the inorganic layer 330 is formed, as illustrated in FIG. 15D, a wavelength conversion solution is applied to the inorganic layer 330 to form a wavelength conversion layer 320 (S4). The wavelength conversion layer 320 includes a plurality of quantum dots QD1 and QD2 and a binding member BD.

According to the embodiment of the inventive concept, the display apparatus may be improved in display quality and many have increased durability.

It will be apparent to those skilled in the art that various modifications and variations can be made in the inventive concept. Thus, it is intended that the present disclosure covers the modifications and variations of this invention provided they come within the scope of the appended claims and their equivalents. Thus, to the maximum extent allowed by law, the scope of the present invention is to be determined by the broadest permissible interpretation of the following claims and their equivalents, and shall not be restricted or limited by the foregoing detailed description.

What is claimed is:
1. A display apparatus comprising:
a display panel configured to display an image;
a light guide member below the display panel;
a light source adjacent to at least one surface of the light guide member; and
an optical member between the light guide member and the display panel,
wherein the optical member comprises:
a wavelength conversion layer configured to convert a wavelength band of incident light;

a low refractive index layer between the wavelength conversion layer and the light guide member, the low refractive index layer comprising a plurality of pores; and an inorganic layer between the low refractive index layer and the wavelength conversion layer, wherein a volume ratio occupied by the pores within the low refractive index layer increases as being closer to the light guide member.

2. The display apparatus of claim 1, wherein the low refractive index layer comprises:

a first portion having a first refractive index and comprising the pores; and a second portion on the first portion and having a second refractive index, wherein the second refractive index is greater than the first refractive index and less than that of the wavelength conversion layer.

3. The display apparatus of claim 2, wherein a ratio of a thickness of the second portion to a total thickness of the low refractive index layer is about 0.3 to about 0.5.

4. The display apparatus of claim 1, wherein the inorganic layer comprises a plurality of crystal particles.

5. The display apparatus of claim 1, wherein the inorganic layer has a thickness of about 700 Å to about 1,500 Å.

6. The display apparatus of claim 1, wherein the inorganic layer comprises silicon nitride (SiNx).

7. The display apparatus of claim 1, wherein the inorganic layer comprises silicon oxide (SiOx).

8. The display apparatus of claim 1, wherein the inorganic layer comprises a plurality of inorganic layers, wherein the plurality of inorganic layers comprises:

a first inorganic layer; and a second inorganic layer between the first inorganic layer and the wavelength conversion layer.

9. The display apparatus of claim 8, wherein the first inorganic layer comprises a material different from that of the second inorganic layer.

10. The display apparatus of claim 8, wherein each of the first inorganic layer and the second inorganic layer has a thickness of about 200 Å to about 600 Å.

11. The display apparatus of claim 8, wherein the optical member further comprises a sub low refractive index layer between the first inorganic layer and the second inorganic layer.

12. The display apparatus of claim 8, wherein the optical member further comprises an organic layer between the first inorganic layer and the second inorganic layer.

13. The display apparatus of claim 1, wherein the optical member further comprises an organic layer between the inorganic layer and the wavelength conversion layer.

14. The display apparatus of claim 1, wherein the optical member further comprises an organic layer between the inorganic layer and the low refractive index layer.

15. The display apparatus of claim 1, wherein the optical member further comprises a barrier layer on the wavelength conversion layer, the barrier layer comprising an inorganic material.

16. The display apparatus of claim 1, wherein the light source generates blue light or near-ultraviolet light, and the wavelength conversion layer comprises a plurality of wavelength conversion particles.

17. A method of manufacturing a display apparatus, the method comprising:

preparing a display panel; and forming an optical member on a light guide member, wherein the forming of the optical member comprises:

forming a low refractive index layer on the light guide member;

depositing an inorganic material on the low refractive index layer to form an inorganic layer; and applying a wavelength conversion solution to the inorganic layer to form a wavelength conversion layer, wherein the forming of the low refractive index layer comprises:

applying a preliminary solution to the light guide member; and drying the preliminary solution to form a plurality of pores, wherein, in the forming of the wavelength conversion layer, a portion of the wavelength conversion solution is permeated into at least a portion of the pores formed in the low refractive index layer.

18. The method of claim 17, wherein the formation of the inorganic layer comprises:

depositing inorganic crystal particles on the low refractive index layer; and adjusting a deposition time of the inorganic crystal particles to adjust a thickness of the inorganic layer, wherein, in the adjusting of the thickness of the crystal particles, an amount of wavelength conversion solution permeated into the pores of the low refractive index layer is adjusted according to a size of each of pin holes or a number of pin holes, each of the pin holes being defined as a space between the inorganic crystal particles.

19. The method of claim 18, wherein the forming of the inorganic layer comprises:

depositing a first inorganic layer on the low refractive index layer; and depositing a second inorganic layer on the first inorganic layer after depositing the first inorganic layer.

20. A backlight unit comprising:

a light source configured to generate blue light or near-ultraviolet light;

a light guide member having at least one surface adjacent to the light source; and an optical member on the light guide member, wherein the optical member comprises:

a wavelength conversion layer configured to convert a wavelength band of incident light;

a low refractive index layer between the wavelength conversion layer and the light guide member, the low refractive index layer comprising a plurality of pores; and an inorganic layer between the low refractive index layer and the wavelength conversion layer, wherein a volume ratio occupied by the pores within the low refractive index layer increases as being closer to the light guide member.

* * * * *